Figure 1:
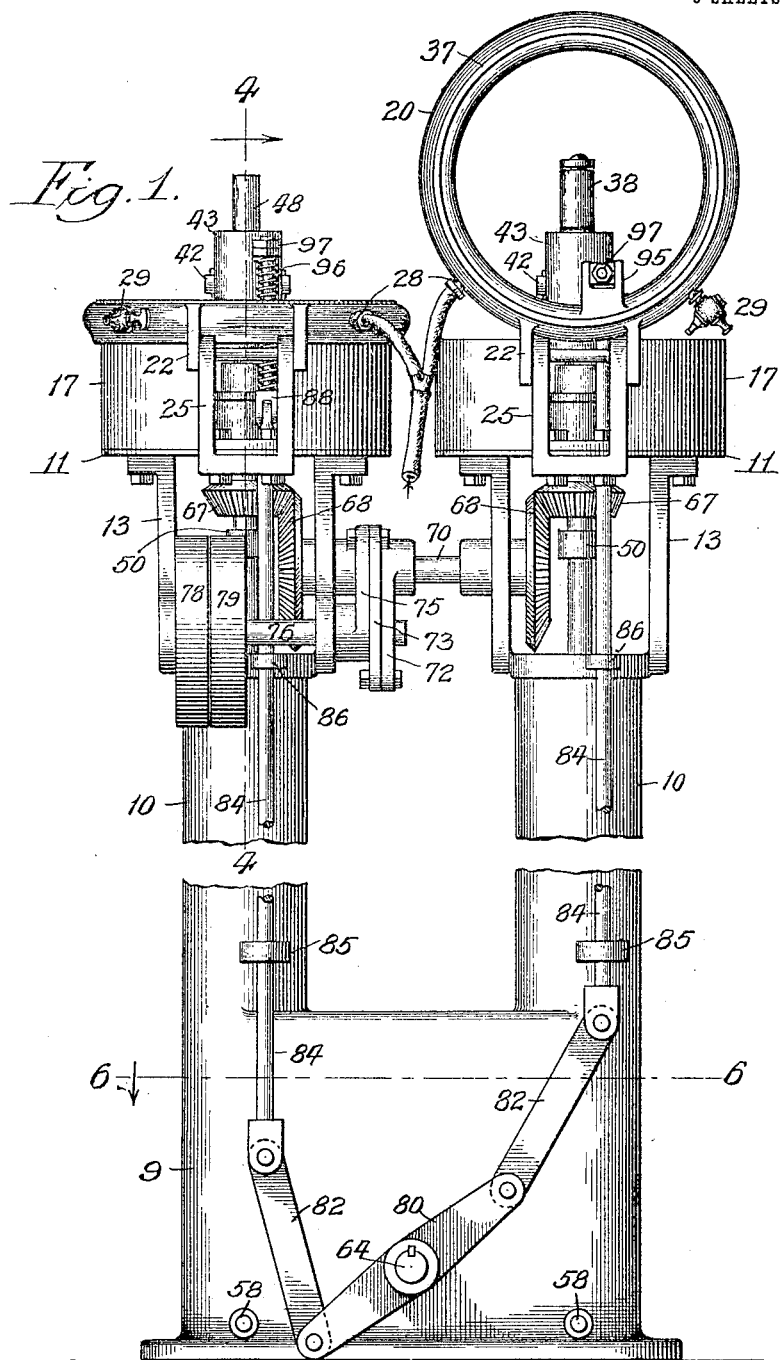

J. J. SELTENREICH.
COLLAR IRONING MACHINE.
APPLICATION FILED AUG. 29, 1913.

1,120,415.

Patented Dec. 8, 1914.
5 SHEETS—SHEET 1.

Witnesses:
John Enders
L. O. French

Inventor:
John J. Seltenreich
by Fred Gerlach
his Atty.

J. J. SELTENREICH.
COLLAR IRONING MACHINE.
APPLICATION FILED AUG. 29, 1913.

1,120,415.

Patented Dec. 8, 1914.

5 SHEETS—SHEET 2.

Witnesses:
John Enders
L. O. French

Inventor:
John J. Seltenreich
by Fred Gerlach
his Atty.

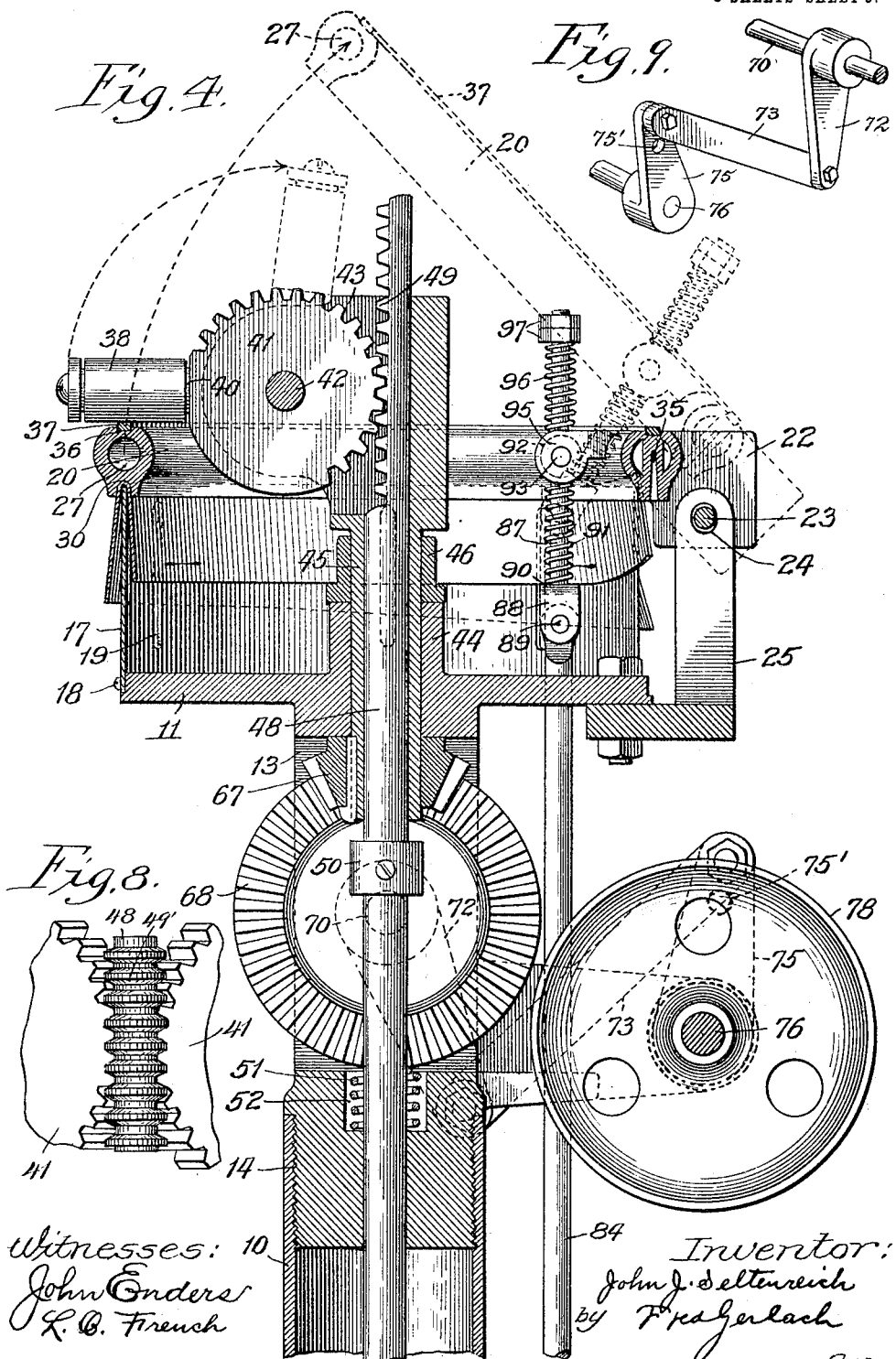

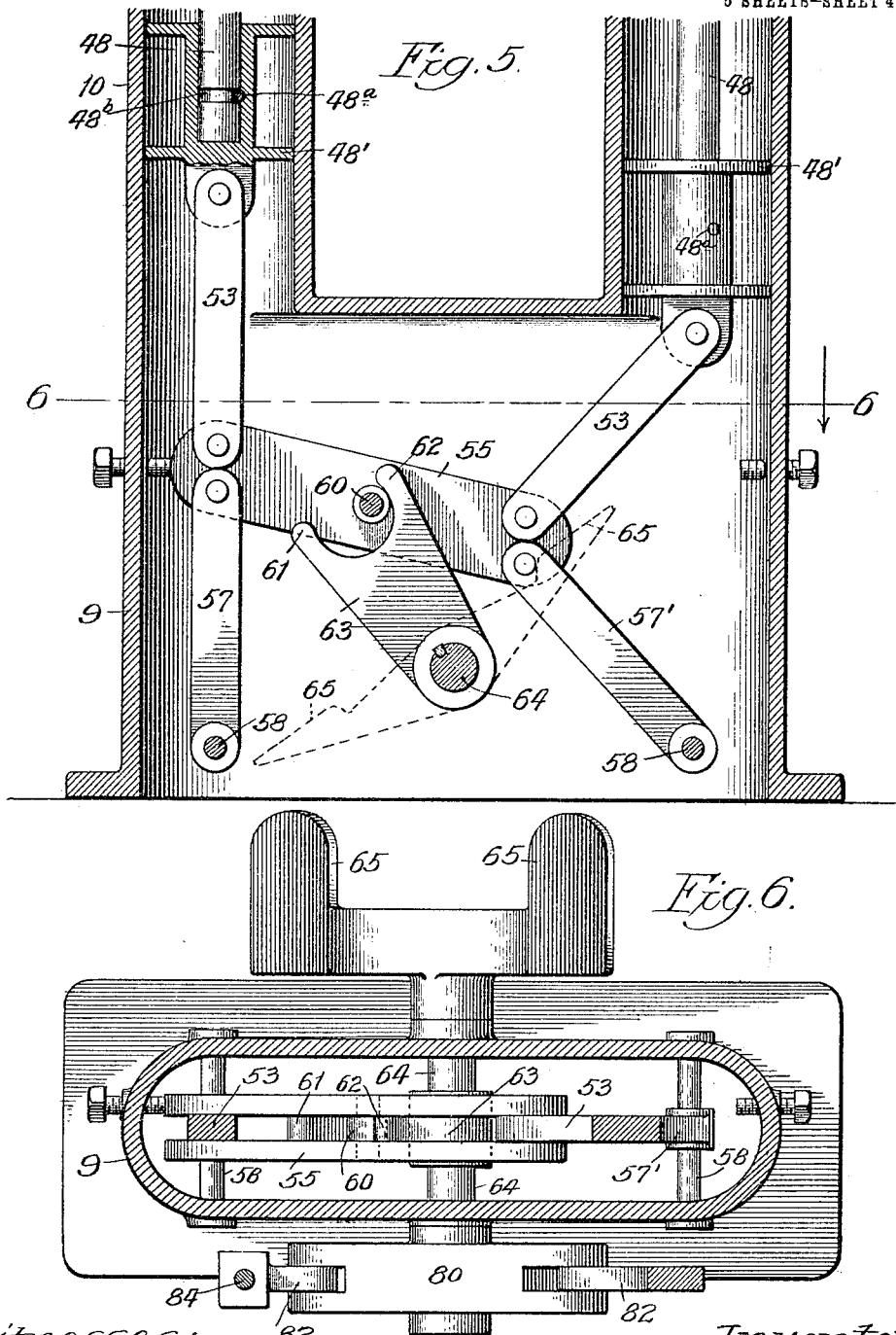

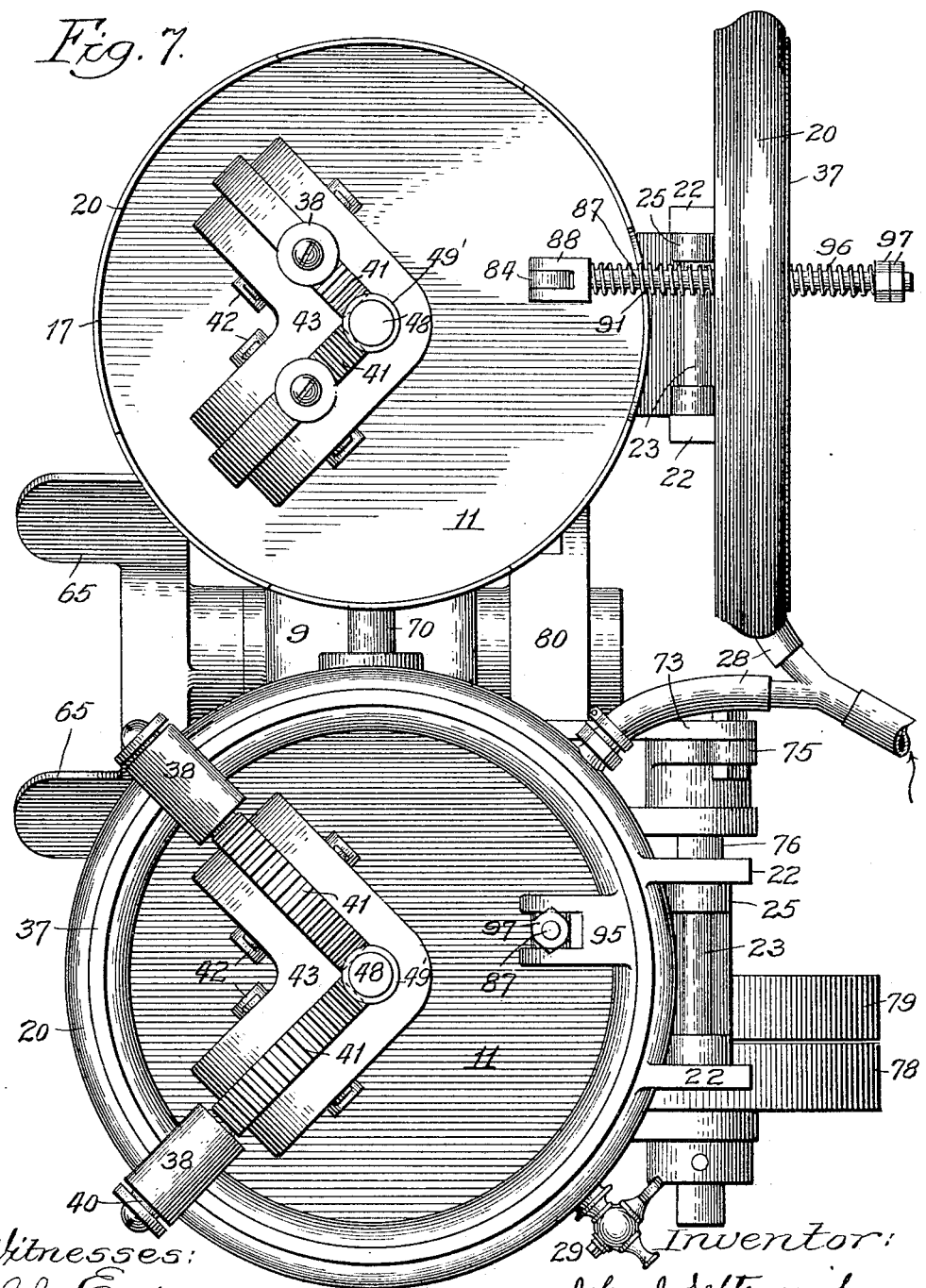

UNITED STATES PATENT OFFICE.

JOHN J. SELTENREICH, OF CHICAGO, ILLINOIS, ASSIGNOR OF ONE-HALF TO EDWARD F. BRAREN, OF CHICAGO, ILLINOIS.

COLLAR-IRONING MACHINE.

1,120,415.  Specification of Letters Patent.  Patented Dec. 8, 1914.

Application filed August 29, 1913. Serial No. 787,271.

*To all whom it may concern:*

Be it known that I, JOHN J. SELTENREICH, a resident of Chicago, in the county of Cook and State of Illinois, have invented certain new and useful Improvements in Collar-Ironing Machines, of which the following is a full, clear, and exact description.

The invention relates to collar ironing machines.

In some of the machines heretofore in use, the ironing is effected by direct contact of a presser device which travels over and engages the collar. In those devices the presser device wears the collar and, since the device applies pressure at one point only, the heat of one of the ironing members is effectively applied only where the device is in engagement with the collar. In another type of device, one ironing member in its entirety is pressed bodily against the collar without the use of any elements such as a device for squeezing one member into and out of contact with the collar, and, without such squeezing action, the turned edge of a collar is not ironed smoothly.

The present invention designs to eliminate the objections to these prior devices and to attain the advantages of both by employing an element between the presser device and the collar and operating said device over the element to successfully squeeze or press different portions thereof against the collar while the member which extends over the entire collar remains sufficiently close to the edge of the collar to apply the heat, when it is not subject to the direct action of the presser device. In this manner the collar is subjected to the squeezing or pressing action of the presser device without contact therewith and without causing the collar to be worn by the presser device, while heat, notwithstanding the varying pressure effected by said device, will be applied to all portions of the collar so that an ironing operation can be quickly completed and so that the edge when ironed will be smooth, as the result of the squeezing action caused by said device.

Another object of the invention is to provide an improved ironing device which comprises a presser device and in which the collar is protected from wear by said device.

The invention further designs to provide an improved collar ironing machine.

The invention consists in the several novel features hereinafter set forth and more particularly defined by claims at the conclusion hereof.

Figure 2:
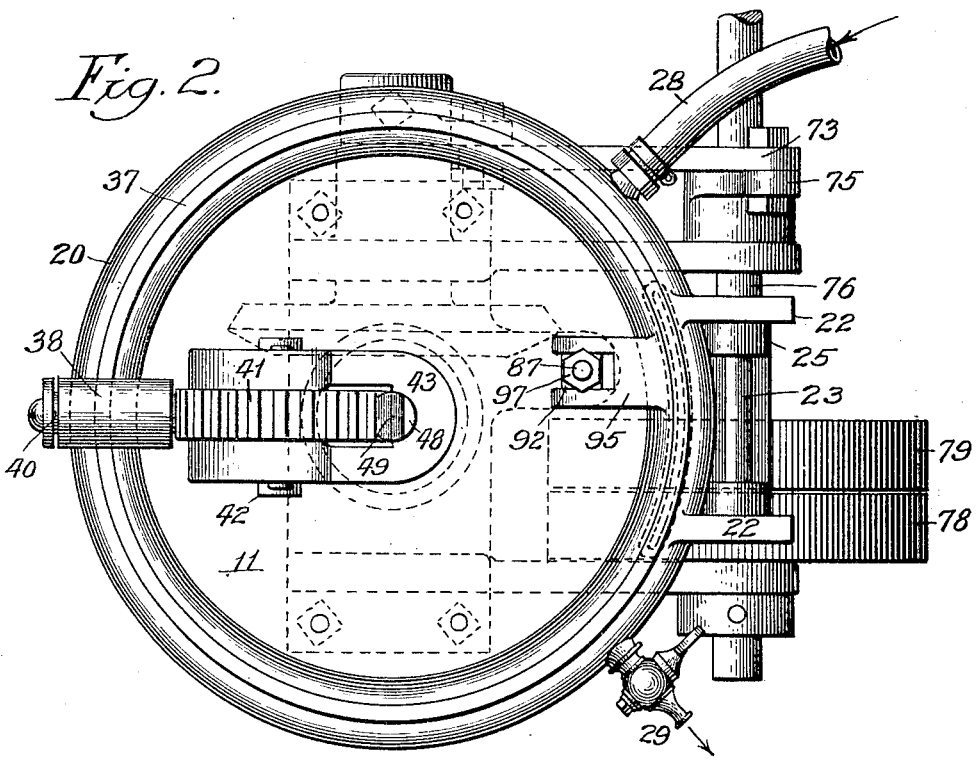
Figure 3:
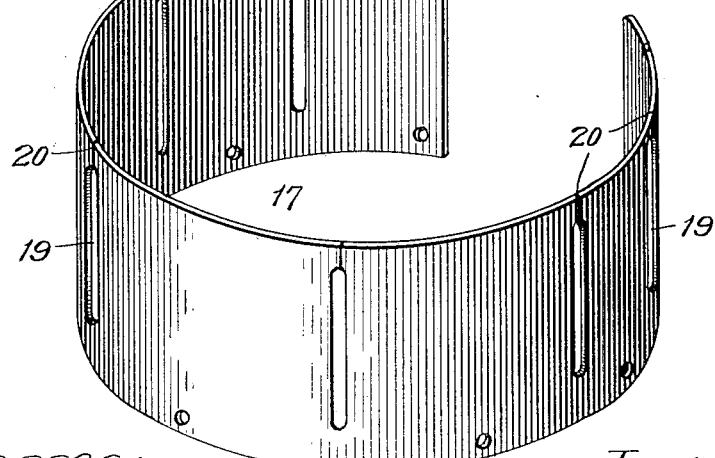

In the drawings: Figure 1 is a rear elevation of a machine showing one of the ironing rings raised to inoperative position and the other in its operative position. Fig. 2 is a plan of one of the two duplicate ironing devices shown in Fig. 1. Fig. 3 is a detail perspective of the collar supporting ring. Fig. 4 is a section taken on line 4—4 of Fig. 1. Fig. 5 is a vertical section of the base of the machine and showing the presser device lifting mechanism. Fig. 6 is a section taken on line 6—6 of Fig. 5. Fig. 7 is a top plan of a modified form of the machine shown in Fig. 1. Fig. 8 is a detail view of the rack which is used with a plurality of presser devices. Fig. 9 is a detail perspective view of the crank on the power shaft and the linkage connected to it.

In the exemplification of the invention shown in the drawings, two collar ironing devices are mounted upon a common base or support and mechanism is provided for operating them to alternately render one of them inoperative to permit removal and placement of a collar therein and to render the other operative. The parts of each ironing device are substantially the same, so that a description of one of them will be applicable to both. Each of the collar ironing devices is mounted on a tubular support or column 10 rising from a common base 9, by means of a head 11 which is secured to the top of a bifurcated bracket 13 which is connected to the upper end of a column 10 by a screw thread 14.

A collar support 17 is secured to the edge of head 11 by screws 18. This collar support is formed of a plate bent into cylindrical form to form an open ring and has its upper edge slitted, as at 20', and is slotted, as at 19, to render the upper edge of the support flexible. This support serves as one of the two elements between which the collar is ironed and is open at the back to leave the ends of the collar free. The purpose of flexibility in the support 17 is to attain a more effective squeezing and working or ironing of the turned edge of the collar when pressure is applied to the collar, as hereinafter more fully set forth.

A steam-cylinder 20 consists of a hollow ring, into the interior 27 of which, steam is admitted through an inlet 28 and exhausted through an outlet 29. The lower surface of the ring is formed with a flared groove or channel 30 to receive and engage the folded edge of the collar when the collar is placed upon the collar-support and ring 20 is placed upon it, as shown in Fig. 4. To accommodate the tab at one end of the collar which usually is turned upwardly, the groove 30 is deeper or extended up as at 35, and this channel 30 and portion 35 are formed so that the whole upper edge of the collar, including the tab, will be subjected to heat when the steam passes through the ring 20. The top of ring 20 is recessed, as at 36, and seated within this recess is a wear-ring 37. The ring 20 is provided with lugs 22 which are pivotally sustained by a rod 23 which extends through apertures 24 in a forked bracket 25 which is secured to the bottom and at the rear of the head 11. Rod 23 fits loosely within the brackets 25, so that the cylinder may be free to swing in a vertical plane and also to permit some bodily movement.

A roller 38 serves as a presser device which is adapted to bear down upon the steam ring 20, when the ring is in operative position on the collar, and to force the ring against the edge of the collar. This presser device is oscillated over the ring to press the different portions thereof downwardly and in doing so causes the collar-support 17 and the ring to be pressed together, while the collar is heated by the ring. In its oscillation over the ring, the presser device successively passes over different portions of the ring and causes the collar to be worked in the groove in the ring and this working or squeezing causes the edge of the collar to be ironed very smoothly and so that rough edges will be eliminated. The loose connection between rod 23 and bracket 25, resulting from play of the rod in holes 24, permits the ring 20 to wabble slightly, responsively to the pressure of the device 38 on the top of the ring.

As a result of the employment of two members, such as collar-support 17 and the heated ring 20, and a presser device working over one of them to press the members together, the presser device does not come in contact with nor wear the edge of the collar. By reason of the pressure of said device being successively exerted upon different points of the ring, burning of the collar will be avoided, while the entire heated member remains sufficiently close to the collar to heat it. The presser device or roller 38 is mounted on a bearing stud 40 which is secured to a segmental gear 41. This gear is pivotally sustained on a shaft 42 in a rotatable support or bracket 43. Rotation of this bracket with the presser device in operative relation to the ring 20 will cause the presser device to successively bear down upon the different portions of the ring. Bracket 43 has a sleeve 45 fitting within a bearing 44 formed in head 11. A collar 46 is secured on said sleeve and engages the top of bearing 44 to hold the bracket against downward movement in bearing 44. The lower end of sleeve 45 extends below bearing 44 and a gear 67 secured thereto holds the sleeve and bracket against upward movement, so that the bracket will be held against vertical movement in the head 11 by collar 46 and said gear. A rack 49 on a rod 48, which extends through sleeve 45, meshes with the gear 41 and serves to operate the presser device into engagement with the wear-ring 37 on the ironing ring 20. Rod 48 rotates with the bracket 43 and is vertically slidable therein to operate the presser device.

The mechanism for rotating the presser device 38 and bracket 43 comprises a beveled gear 67 which is keyed to the lower end of sleeve 45, a beveled gear 68 on a cross shaft 70 which is journaled in brackets 13, an arm 72 rigid on shaft 70, a link 73 connected to the distal end of arm 72 and to an arm 75, and a shaft 76 to which arm 75 is secured. Shaft 76 is provided with tight and loose pulleys 78, 79, which are rotated by a belt (not shown). Rotation of shaft 76 by one of the pulleys thereon, will rotate arm 75 and operate link 73 to oscillate arm 72 and gears 68 and 67. Such operation of gear 67 will oscillate bracket 43 and presser device 38 which is carried thereby, to cause the presser device to work over all portions of the ring 20 which are disposed over the collar to attain the result hereinbefore set forth.

Mechanism is provided for operating rod 48 longitudinally to rock gear 41 and swing the presser device 38 into and out of operative relation to ring 20, so that when the presser device is raised away from the ring, the latter will be free to be swung upwardly, as indicated by dotted lines in Fig. 4, and the operator may place a collar on the support 17 or remove an ironed collar therefrom. The mechanism for operating rod 48 and ring 20 comprises a shaft 64 to which pedals 65 are secured. The rear end of shaft 64 has affixed thereto a lever 80 which is connected by a link 82 to a rod 84 which is slidably mounted in guides 85 and 86.

Pivotally mounted on the upper end of the rod 84 is a rod 87 which is provided with bifurcations 88 at its lower end and pivoted to the rod 84 by pin 89. Rod 87 is shouldered, as at 90, and a coil-spring 91 is fitted thereon. Fitting on the top of the coil-spring 91 is a block 92 through which rod 87 is free to slide and which is provided with studs 93 which are pivotally held in a lug 95 on the ring 20. Another coil-spring 96, similar to 91, is fitted on the upper end of the rod 87 and all of these moving parts are held in place by lock-nuts 97. This spring connection serves to yieldingly hold and operate the ring 20.

The mechanism for operating rod 48 to elevate and depress the presser device 38 comprises a link 53 which is pivoted to a slidable guide 48' to which the lower end of rod 48 is connected by a pin 48$^a$ and groove 48$^b$ and to a floating link 55 which is pivotally sustained between the links 53 for operating the rods 48 for the two ironing devices, respectively. The swivel connection 48$^a$, 48$^b$ between rod 48 and guide 48' permits the rod to rotate with presser-support 43, without rotating said guide. The center of link 55 is provided with a projecting stud 60 which is engaged by either of the projections 61 and 62 on a lever 63 which is secured to the pedal shaft 64. The floating link 55 is also guided by links 57 and 57' which have their upper ends pivoted to the floating link and their lower ends pivoted to pins 58 in the base 9, respectively. Links 53, 57 are disposed to act as a toggle and lock the presser device in operative position. The space between projections 61 and 62 on lever 63 serves to provide a lost motion connection which causes shaft 64 to operate rod 84 to lower ring 20 before the presser device is operated into the path of said ring when the treadle is operated to bring the ring and presser device into operative relation to iron a collar. Spring 91 permits the ring operating connection to yield during the initial movement of the treadle without operating the ring until the operating connection for the presser device has been unlocked by the initial movement of the treadle and the presser device is operated about its pivot to permit the ring 20 to move upwardly. This occurs when the treadle is operated after an ironing operation, to permit an ironed collar to be removed from the support 17 and to be replaced with one to be ironed. A stop-collar 50 is secured to rod 48 and is adapted to engage a spring 51 seated in a recess 52 of bracket 13 to cushion the downward movement of said rod.

Both of the ironing devices are connected so as to be operated into and out of operative position by a lever which is provided with two foot pieces 65 at opposite sides of its fulcrum to permit shaft 64 to be rocked in either direction. The operating connections for each ironing device are substantially alike, and are alternately operated, so that one of them will be rendered operative for an ironing operation when the other is rendered inoperative to permit an ironed collar to be removed and replaced. Lever 80 is provided with oppositely extending arms to which links 82 for the ring operating connections are respectively secured, so that one link will be raised when the other is lowered. The floating link 55 is connected to the operating links 53 for the presser operating connections, respectively, and, when shifted to one side by lever 63, will operate the link 53 for one ironing device into position to hold the presser device in operative relation and will operate the link 53 of the operating connection for the other presser device into position to raise said device. In this manner, operation of the treadle 65 in one direction will simultaneously render one of the ironing devices operative and will operate the other for replacement and removal of the collar.

When the lever 63 has been shifted to one of its alternative positions, the linkage 53, 55, 57 at one side of the base will hold rod 48 raised, while the linkage 53, 57' at the other side of the base will have been operated by link 55 to lower the other rod 48. The raised rod 48, acting on the presser device through rack 49 and gear 41, will hold the cylinder 20 in engagement with the collar on support 17, while the rod 48 at the other side, acting through its rack 49 and gear 41, will hold the presser device raised, as indicated by dotted lines in Fig. 4. When the treadle is operated from one of its alternative positions to the other, the locked linkage will be released and operated to lower one rod 48, while the other linkage will be operated to raise and lock the other rod 48. When the treadle is in one of its alternative positions, one of the arms of the lever 80 on shaft 64 will, acting through one of the links 82, hold one of the ring operating rods 84 raised, while the ring operating rod 84 for the other ironing device will be lowered by its link 82. Each time the treadle is operated, it will thus cause the presser device and ring 20 of one ironing device to be raised and to lower the ring and presser device of the other ironing device. Resultantly, the treadle serves through its connections to alternatively raise the presser device and ring of one ironing device out of operative position and to lower the presser device and ring of the other ironing device into operative position. In lowering each of the rods 84, the lost motion connection between arm 63 and link 55 will cause the ring 20 to be lowered before the presser device is lowered, so that the presser device, when lowered, will swing downwardly onto said ring. During each upward movement of one of the rods 84, spring 91 will permit said rod 84 to be operated by the treadle without shifting ring 20, until after the presser device has been released and raised.

The operation of the mechanism for rotating the ironing devices will be as follows: The fast pulley on shaft 76 will drive the shaft constantly. Crank 75 on said shaft will, through link 73, operate crank 72 on shaft 70 to oscillate both of the gears 68 on said shaft. Said gears will oscillate or rotate gears 67 to and fro to rotate the presser carrying heads 43 to the sleeves 45 of which gears 67 are respectively secured. This operation of the presser devices will cause them to successively exert pressure upon the different portions of the heated ring 20 to iron the collar held in the ironing device which is in operative position. This operation is continued until the collar has been ironed. Then the operator will shift treadle 65 having, while a collar was being ironed in one ironing device, placed a collar to be ironed in the other ironing device, to open the ironing device which has completed an ironing operation and to render the other ironing device operative, so that the ironed collar may be removed and replaced with another collar to be ironed.

A modification of the invention is shown in Fig. 7, in which a plurality of presser devices 38 are carried by each bracket 43, the operating rod 48 being formed with a rack 49′ comprising a pair of rack faces both of which are similar to rack 49, having suitably formed teeth for conjointly operating both of the gears 41′, of the presser devices. When two presser devices are employed, the sweep or oscillation of bracket 43 and the presser devices may be less. For this purpose, the crank 75 is provided with an opening 75′ by which link 73 may be connected to crank 75 to impart a shorter stroke to crank 72 and gears 68. By connecting link 73 to hole 75ª in arm 75, the stroke of said link will be shortened. This adjustment will result in a shorter stroke of arm 72 and in varying the degree of rotation of the presser device.

The invention thus provides an improved ironing machine in which a working or squeezing action between the two ironing members, one of which is heated, is effected by means of a presser device or devices without permitting the said devices to work directly upon the collar, and in which provision is made for a plurality of ironing devices and mechanism for conjointly operating them to alternately open and close them.

The invention is not to be understood to be restricted to the details set forth, since these may be modified within the scope of the appended claims without departing from the spirit and scope of the invention.

Having thus described my invention, what I claim as new, and desire to secure by Letters Patent, is:—

1. In a collar ironing machine, the combination of two ironing members, one of which is formed with a groove and the other of which is formed to engage the inside of the folded edge of a collar in said groove, means for heating one of the members, a device for applying pressure to force the members together to iron the collar between them, mounted to move relatively to said members, to press different portions of the members to iron the collar between them, and mechanism for shifting the presser device relatively to the members.

2. In a collar ironing machine, the combination of two ironing members, one of which is pivotally sustained and is formed with a groove to receive the folded edge of a collar, the other of which is stationary, means for heating one of the members, a device for applying pressure to the pivoted member to press the members together to iron the collar between them, mounted to move relatively of the pivoted member to apply pressure to different portions of said pivoted member, and mechanism for shifting said device relatively to the pivoted member.

3. In a collar ironing machine, the combination of two ironing rings, one of which is stationary and the other of which is pivotally sustained and formed with a groove to receive the folded edge of a collar, means for heating one of the rings, a presser device separate from said rings for engaging one of the rings to iron the collar, and mechanism for operating said device.

4. In a collar ironing machine, the combination of two ironing members, one of which is formed with a groove to receive the folded edge of the collar, the other being formed to engage the inside of said edge, means for heating one of the members, a device mounted to apply pressure to one of the members to iron a collar between them and rotatable relatively to said members to apply pressure to different portions thereof and mechanism for rotating said device relatively to the members.

5. In a collar ironing machine, the combination of two ironing members, one of which is stationary, the other being pivotally sustained and formed with a groove to receive the folded edge of a collar, means for heating one of the members, a device separate from said members for pressing the members together to iron the collar between them, and mechanism for rotating said device.

6. In a collar ironing machine, the combination of two ironing rings, one of which is stationary, the other being pivotally sustained and formed with a groove to receive the folded edge of a collar, means for heating the grooved ring, a device for pressing the rings together to iron the collar between them, and mechanism for rotating said device.

7. In a collar ironing machine, the combination of two ironing members, one of which is formed with a groove, the other being formed to engage the inside of the folded edge of a collar in said groove, means for heating one of the members, a device separate from said ironing members for pressing the members together to iron the collar between them, mechanism for shifting said device into and out of operative relation to one of the ironing members and mechanism for operating said device to press the different portions of the members together.

8. In a collar ironing machine, the combination of two ironing rings, one of which is formed with a groove to receive the folded edge of a collar, the other being formed to engage the inside of said edge, means for heating one of the rings, a device separate from said rings for pressing the members together to iron the collar between them, mechanism for shifting said device to and from one of the rings, and mechanism for operating said device to press the rings together.

9. In a collar ironing machine, the combination of two ironing members, one of which is stationary, the other being pivotally sustained and formed with a groove to receive the folded edge of a collar, means for heating the grooved member, a device for pressing the members together to iron a collar between them, mechanism for shifting said device to and from one of the ironing members, and mechanism for operating said device to press the members together.

10. In a collar ironing machine, the combination of two ironing rings, one of which is formed with a groove to receive the folded edge of a collar, the other being formed to engage the inside of said edge, means for heating one of the rings, a presser device for operating one of the rings to iron the collar, mechanism for shifting said device to and from one of the ironing rings and mechanism for operating said device to press the different portions of the members together.

11. In a collar ironing machine, the combination of two ironing members, one of which is formed with a groove to receive the folded edge of a collar, the other being formed to engage the inside of said edge, means for heating one of the members, a device for pressing the members together to iron the collar between them, one of said members being movable away from the other to permit a collar to be placed in position to be ironed, mechanism for operating said device into and out of operative relation to said movable member, and mechanism for rotating said device.

12. In a collar ironing machine, the combination of two ironing rings, one of which is formed with a groove to receive the folded edge of a collar, the other being formed to engage the inside of said edge, means for heating one of the rings, a device for pressing the rings together to iron the collar between them, one of said rings being movable away from the other to permit a collar to be placed in position to be ironed, mechanism for operating said device into and out of operative relation to said movable ring, and means for rotating said device.

13. In a collar ironing machine, the combination of two ironing members, one of which is formed with a groove to receive the folded edge of a collar, the other being formed to engage the inside of said edge, means for heating one of the members, a presser device for operating one of the members to iron the collar between them, one of said members being pivoted so it may be swung away from the other to permit a collar to be placed in position to be ironed, mechanism for operating said device into and out of operative relation to said movable member, and mechanism for rotating said device.

14. In a collar ironing machine, the combination of two ironing rings, one of which is formed with a groove to receive the folded edge of a collar, the other being formed to engage the inside of said edge, means for heating the grooved member, a device for pressing the rings together to iron the collar between them, the grooved ring being pivoted so it may be swung away from the other ring to permit a collar to be placed in position to be ironed, mechanism for operating said device into and out of operative relation to said movable member, and means for rotating said device.

15. In a collar ironing machine, the combination of two ironing members, one of which is formed with a groove to receive the folded edge of a collar, the other being formed to engage the inside of said edge, means for heating one of the members, a device for pressing the members together to iron the collar between them, one of said members being movable away from the other to permit a collar to be placed in position to be ironed, said device being movable to and from said movable member and mechanism for conjointly operating the shoe and said movable member.

16. In a collar ironing machine, the combination of two ironing members, one of which is formed with a groove to receive the folded edge of a collar, the other being formed to engage the inside of said edge, means for heating one of the members, a device for pressing the members together to iron the collar between them, one of said members being movable away from the other to permit a collar to be placed in position to be ironed, said device being movable into and out of operative relation to said movable member, mechanism for conjointly shifting said device and said movable member, and mechanism for rotating said device.

17. In a collar ironing machine, the combination of two ironing members, one of which is formed with a groove to receive the folded edge of a collar, the other being formed to engage the inside of said edge, means for heating the grooved member, a device for pressing the members together to iron a collar between them, one of said members being pivoted to swing away from the other to permit a collar to be placed in position to be ironed, said device being movable into and out of operative relation to said movable member, mechanism for conjointly shifting said device and said movable member, and mechanism for rotating said device.

18. In a collar ironing machine, the combination of two ironing members, one of which is formed with a groove to receive the folded edge of a collar, the other being formed to engage the inside of said edge, means for heating the grooved member, a device for pressing the members together to iron the collar between them, said grooved member being pivoted to swing away from the other to permit a collar to be placed in position to be ironed, said device being movable into and out of operative relation to said movable member, mechanism for conjointly operating said device and said movable member, and mechanism for rotating said device.

19. In a collar ironing machine, the combination of two ironing members one of which is provided with a groove for receiving the turned edge of a collar, the other being formed to engage the inside of said edge, means for heating one of the members, one of said members being resilient, a device for applying pressure to one of said members and movable relatively thereto to press different portions of the members together to iron a collar between them and mechanism for shifting said device relatively to said members.

20. In a collar ironing machine, the combination of two ironing members, one of which is formed with a groove to receive and iron the folded edge of a collar, means for heating the grooved member, one of said members being movable to permit a collar to be placed between the members, a device separate from said members for squeezing the members together, said device being movable into and out of operative relation with one of the members, and a lever operatively connected to shift the movable ironing member and said device into operative position.

21. In a collar ironing machine, the combination of two ironing members, one of which is formed with a groove to receive and iron the folded edge of a collar, means for heating the grooved member, one of said members being movable to permit a collar to be placed between the members, a device for squeezing the members together, said device being movable into and out of operative relation with one of the members, a lever operatively connected to shift the movable ironing member and said device into operative position, and means for rotating said device.

22. In a collar ironing machine, the combination of two ironing members, one of which is formed with a groove to receive and iron the folded edge of a collar, means for heating the grooved member, one of said members being pivoted to swing away from the other to permit a collar to be placed between the members, a device for squeezing the members together, said device being movable into and out of operative relation with one of the members, a lever operatively connected to shift the movable ironing member and said device, and mechanism for rotating said device.

23. In a collar ironing machine, the combination of two ironing members, one of which is formed with a groove to receive and iron the folded edge of a collar, means for heating the grooved member, one of said members being pivotally sustained to swing away from the other to permit a collar to be placed between the members, a device for squeezing the members together, said device pivoted to swing vertically into and out of operative relation with one of the members, and a lever operatively connected to swing the movable ironing member and said device.

24. In a collar ironing machine, the combination of two ironing members, one of which is formed with a groove to receive and iron the folded edge of a collar, means for heating the grooved member, one of said members being movable to permit a collar to be placed between the members, a device separate from said ironing members for squeezing the members together, said device being movable into and out of operative relation with one of the members, a lever for shifting said device and said movable member, and a lost motion connection between said lever and one of the parts adapted to be shifted thereby.

25. In a collar ironing machine, the combination of two ironing members, one of which is formed with a groove to receive and iron the folded edge of a collar, means for heating the grooved member, one of said members being pivoted to permit a collar to be placed between the members, a device separate from said ironing members for squeezing the members together, said device being pivoted to swing into and out of operative relation with one of the members, a lever for shifting said device and said movable member, and a lost motion connection between said lever and one of the pivoted parts adapted to be shifted thereby.

26. In a collar ironing machine, the combination of two ironing members, one of which is pivoted to swing vertically and formed with a groove to receive and iron the folded edge of a collar, means for heating the grooved member, the other member being stationary, a device for squeezing the members together, said device being movable into and out of operative relation with the grooved member, a lever for shifting said device and said movable member, and a lost motion connection between said lever and one of the parts adapted to be shifted thereby.

27. In a collar ironing machine, the combination of two ironing members, one of which is formed with a groove to receive and iron the folded edge of a collar, means for heating the grooved member, one of said members being movable to permit a collar to be placed between the members, a device separate from said ironing members for squeezing the members together, said device being movable into and out of operative relation with one of the members, a lever for shifting said device and said movable member, and a lost motion connection between said lever and said device.

28. In a collar ironing machine, the combination of two ironing members, one of which is formed with a groove to receive and iron the folded edge of a collar, means for heating the grooved member, one of said members being movable to permit a collar to be placed between the members, a device separate from said members for squeezing the members together, said device being movable into and out of operative relation with one of the members, a lever for shifting said device and the movable ironing member, a yielding connection between the lever and one of the parts operated thereby and a lost motion connection between the lever and the other part adapted to be operated thereby.

29. In a collar ironing machine, the combination of two ironing members, one of which is formed with a groove to receive and iron the folded edge of a collar, means for heating the grooved member, one of said members being movable to permit a collar to be placed between the members, a device separate from said ironing members for squeezing the members together, said device being movable into and out of operative relation with one of the members, a lever for shifting said device and the movable ironing member, a yielding connection between the lever and said movable member, and a lost-motion connection between the lever and said device.

30. In a collar ironing machine, the combination of two ironing rings, one of which is formed with a groove to receive and iron the folded edge of a collar, means for heating the grooved ring, one of said rings being movable to permit a collar to be placed between the rings, a device separate from said ironing rings for squeezing the rings together, said device being movable into and out of operative relation with one of the rings, a lever for shifting said device and the movable ring, a yielding connection between the lever and one of the parts operated thereby and a lost-motion connection between the lever and the other part operated thereby.

31. In a collar ironing machine, the combination of two ironing members, one of which is provided with a groove for ironing the turned edge of a collar, the other being formed to engage the inside of said edge, means for heating one of said members, a device for squeezing the members together to iron the collar, a rotatable support carrying said device, said support and device being rotatable relatively of said members to squeeze them together, and mechanism for rotating the support to rotate said device relatively of said members.

32. In a collar ironing machine, the combination of two ironing members, one of which is provided with a groove for ironing the turned edge of a collar, the other being formed to engage the inside of said edge, means for heating the grooved member, a device engaging one of the members and for squeezing the members together to iron the collar, a rotatable support, a pivotal connection between said device and the support and mechanism for rotating the support to rotate said device relatively of said members.

33. In a collar ironing machine, the combination of two ironing rings, one of which is provided with a groove for ironing the turned edge of a collar, the other being formed to engage the inside of said edge, means engaging one of the members and for heating the grooved member, a device for squeezing the rings together to iron the collar, a rotatable support carrying said device and mechanism for rotating the support to rotate said device relatively of said members.

34. In a collar ironing machine, the combination of two ironing rings, one of which is pivotally sustained and provided with a groove for ironing the turned edge of a collar, the other being stationary and formed to engage the inside of said edge, means for heating the grooved member, a device engaging one of the members for squeezing the members together to iron the collar, a rotatable support, a pivotal connection between said device and said support, and mechanism for rotating the support to rotate said device relatively of said members.

35. In a collar ironing machine, the combination of two ironing members, one of which is provided with a groove for ironing the turned edge of a collar, the other being formed to engage the inside of said edge, means for heating one of said members, a device for squeezing the members together to iron the collar, a rotatable support carrying said device, mechanism for rotating the support, and mechanism for raising and lowering said device relatively to said support.

36. In a collar ironing machine, the combination of two ironing members, one of which is provided with a groove for ironing the turned edge of a collar, the other being formed to engage the inside of said edge, means for heating one member, a device for squeezing the members together to iron the collar, one member being pivotally sustained to swing away from the other, a rotatable support carrying said device, mechanism for rotating the support, and mechanism for raising and lowering said device.

37. In a collar ironing machine, the combination of two ironing rings, one of which is provided with a groove for ironing the turned edge of a collar, the other being formed to engage the inside of said edge, means for heating one ring, a device for squeezing the rings together to iron the collar, means for pivotally sustaining one ring, a rotatable support carrying said device, mechanism for rotating the support, and mechanism for raising and lowering said device.

38. In a collar ironing machine, the combination of two ironing members, one of which is provided with a groove for ironing the turned edge of a collar, the other being formed to engage the inside of said edge, means for heating one member, a device for squeezing the members together to iron the collar, a rotatable support carrying said device, mechanism for rotating the support, a rod slidably mounted in said support, and means operated by the rod for shifting said device into and out of engagement with one ironing member.

39. In a collar ironing machine, the combination of two ironing members, one of which is provided with a groove for ironing the turned edge of a collar, the other being formed to engage the inside of said edge, means for heating one member, a device for squeezing the members together to iron the collar, a rotatable support carrying said device, mechanism for rotating the support, a rod slidably mounted in said support, and a gear-connection between the rod and said device for shifting said device into and out of engagement with one ironing member.

40. In a collar ironing machine, the combination of a pair of ironing devices each comprising two members, one of which is formed with a groove to receive and iron the turned edge of a collar, means for heating one member, one member being movable to permit a collar to be placed between the members and a device movable into and out of operative position for squeezing the members together, and mechanism for conjointly operating said device and movable member of one device into operative position and for shifting said device and member of the other device to their inoperative position, and mechanism for operating said devices.

41. In a collar ironing machine, the combination of two ironing rings, one of which is provided with a groove for receiving the turned edge of a collar, the other being formed to engage the inside of said edge, means for heating one member, a device for squeezing the members together to iron the collar, mechanism for rotating said device to and fro and mechanism for varying the degree of rotation of said device.

42. In a collar ironing machine, the combination of two ironing rings, one of which is provided with a groove for ironing the turned edge of a collar, the other being formed to engage the inside of said edge, means for heating one ring, a device for squeezing the members together to iron the collar, mechanism for rotating said device and wear means on one of the rings engaged by said device.

43. In a collar ironing machine, the combination of two ironing rings, one of which is provided with a groove for ironing the turned edge of a collar, the other of which is formed to engage the inside of said edge, means for heating one ring, a loose pivotal connection for sustaining one ring, a device for applying pressure to the pivotally sustained ring for squeezing the rings together to iron a collar between them, movable relatively to the pivoted ring to apply pressure to different portions thereof, and mechanism for shifting said device relatively to said ring.

JOHN J. SELTENREICH.

Witnesses:
FRED GERLACH,
KATHARINE GERLACH.